United States Patent [19]

Matsuhashi

[11] Patent Number: 5,709,363
[45] Date of Patent: Jan. 20, 1998

[54] STRUCTURE OF POWERED SEAT

[75] Inventor: Masahiro Matsuhashi, Akishima, Japan

[73] Assignee: Tachi-S Co., Ltd., Tokyo, Japan

[21] Appl. No.: 609,681

[22] Filed: Mar. 1, 1996

[51] Int. Cl.$^6$ ............................................... F16M 13/00
[52] U.S. Cl. ................................... 248/421; 297/330
[58] Field of Search ................................. 248/419, 420, 248/421, 422, 423, 157, 393, 395; 297/330

[56] References Cited

U.S. PATENT DOCUMENTS

| 5,267,717 | 12/1993 | Isomura | 248/419 X |
| 5,275,457 | 1/1994 | Satoh et al. | 248/419 X |
| 5,501,422 | 3/1996 | Chinomi | 248/419 |

FOREIGN PATENT DOCUMENTS

| 2-032439 | 2/1990 | Japan . |
| 5-238293 | 11/1993 | Japan . |

*Primary Examiner*—Ramon O. Ramirez
*Attorney, Agent, or Firm*—Browdy and Neimark

[57] ABSTRACT

A structure of powered seat including a main bracket provided at a forward point of seat fore-and-aft adjustment device, and in that main bracket, a motor of the seat fore-and aft adjustment device is secured. Further, the structure has a sub bracket in which drive mechanisms of forward and backward seat height adjustment devices are secured, to thereby provide one unit of seat height adjustment device. The sub bracket is detachably secured to the main bracket, whereby such unit of seat height adjustment device may be connected to the seat fore-and-aft adjustment device, permitting thus use in a driver's seat, or may be removed from the same seat fore-and-aft adjustment device, permitting use in a assistant or navigator's seat which does not require height adjustment.

9 Claims, 2 Drawing Sheets

STRUCTURE OF POWERED SEAT

BACKGROUND OF INVENTION

1. Field of the Invention

The present invention relates to a structure of a powered seat for use in an automobile, which has a motor drive control arrangement for adjustment of seating positions in height as well as in the forward and backward directions.

2. Description of Prior Art

The so-called powered seat is a seat with a motor drive control arrangement enabling a driver or passenger to effect adjustments in the vertical and fore-and-aft directions, so that he or she can attain his or her optimal seating posture. In this seat, typically, there are provided a seat slide mechanism for the fore-and-aft adjustment of seat and a pair of forward and backward lifting mechanisms for the vertical adjustment of seat, all of which are driven properly by control of associated motors, which is known, for example, from the Japanese Laid-Open Patent Pub. No. 5-238293 and Japanese Laid-Open Pub. No. 2-32439. In this conventional powered seat structure, the motors associated with the seat height adjustment mechanism (a seat lifter) are disposed below the base frame of seat or between a pair of seat fore-and-aft adjustment mechanisms (a pair of slide rail devcies) provided on the respective two lateral sides of seat. Further, the motors associated with the seat fore-and-aft adjustment mechanims are disposed between two movable members below the seat or on a bracket integral with a base frame of the seat.

The foregoing powered seat structure is indeed suited for use in a driver's seats, but not directly applied to an assistant or navigator's seat next to the driver's seat. This is because the assistant or navigator's seat does not require the seat height adjustment mechanism or device. Even if the height adjustment device is removed from this kind of powered seat structure, the support members or brackets for supporting that height adjustment device are inevitably left by the reason that the mount member or support bracket for supporting the height adjustment device is continuous with the base frame of seat as a complete integral unit. Such integral support bracket further remain occupying most of space below the seat, which prevents other uses for the assistant or navigator's seat. As a result, the conventional powered seat construction has not been adaptable for common use with both driver's and assistant or navigator's seat.

Moreover, in the conventional powered seat, a support bracket for supporting the fore-and-aft adjustment mechanism is provided in a manner interfering with its nut block member movable along the longitudinal axis of lead screw spindle, and thus requires a particular shaping to avoid such interference as by bending or cutting works, which results in a complicated whole shape of the bracket and a troublesome additional works involved therein.

SUMMARY OF THE INVENTION

In view of the above-stated drawbacks, it is a primary purpose of the present invention to provide an improved structure of powered seat which permits easy selective use in one of driver's seat and assistant or navigator's seat.

To accomplish such purpose, in accordance with the present invention, a structure of powered seat basically comprises:

a main bracket to which a motor of a pair of seat fore-and-aft adjustment devices (e.g. slide rail devices) is secured, the main bracket being provided on one end portion of upper movable member of the seat fore-and-aft adjustment devices which corresponds to a forward side of seat; and a sub bracket detachably secured to said main bracket;

wherein a pair of forward and backward seat height adjustment devices (e.g. seat lifters) are secured to said sub bracket, to thereby provide one unit of seat height adjustment device, so that such one unit of seat height adjustment device is detachably mounted on the main bracket via the sub bracket.

Preferably, the structure may include at least one support means for collectively supporting both another ends of linkages respectively of the two forward and backward seat height adjustment devices and further connecting the same another ends of linkages to the sub bracket and an engagement means for operatively engaging those another ends of linkages with drive mechanisms respectively of the two forward and backward seat height adjustment devices.

Other various features and advantages of the present invention will become apparent from reading of the descriptions hereinafter, with reference to the annexed drawings.

DETAILED DESCRIPTION OF PREFERRED EMBODIMENT OF THE INVENTION

Figure 1:
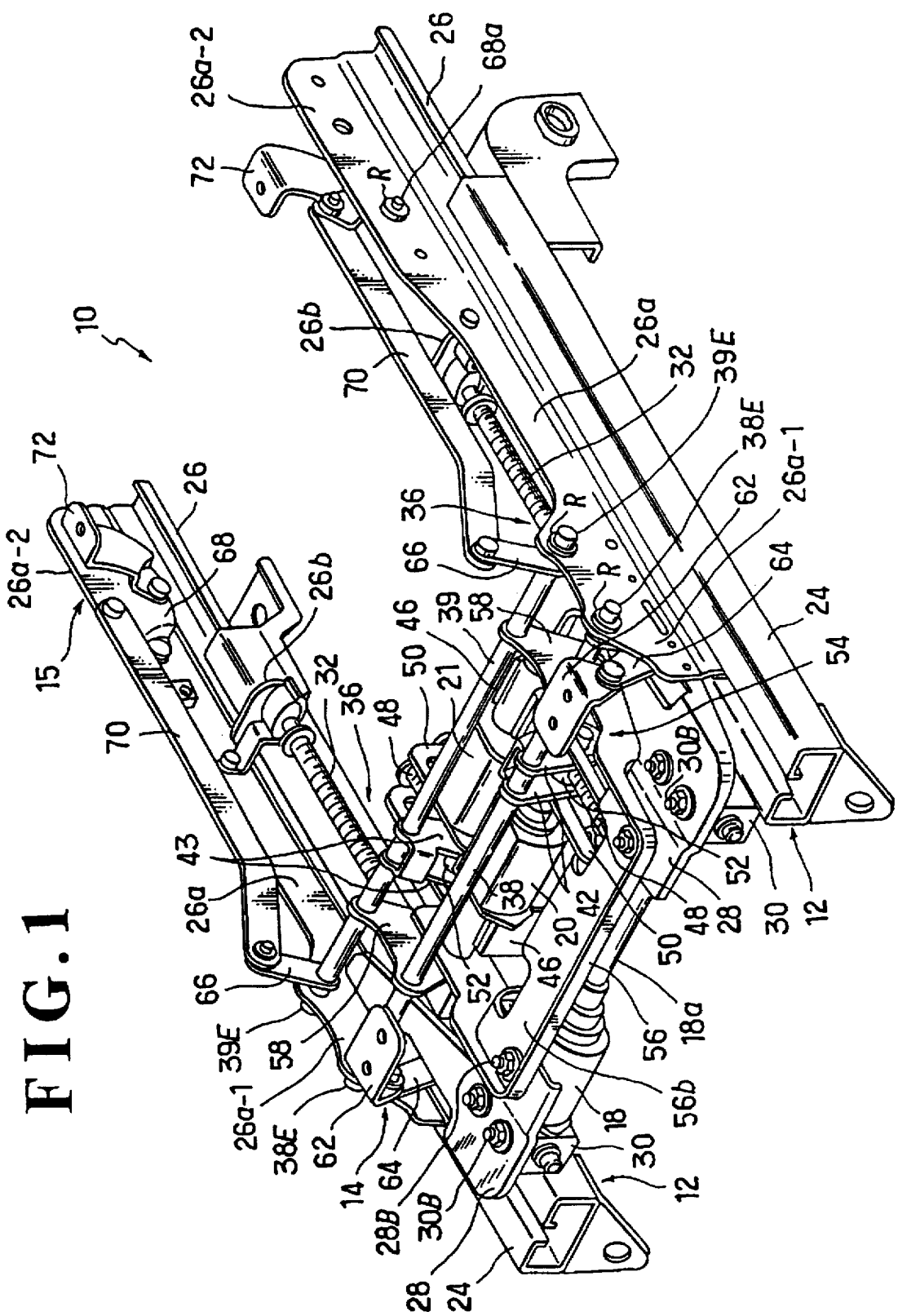
FIG. 1 is a schematic perspective view showing a structure of powered seat in accordance with the present invention.
Figure 2:
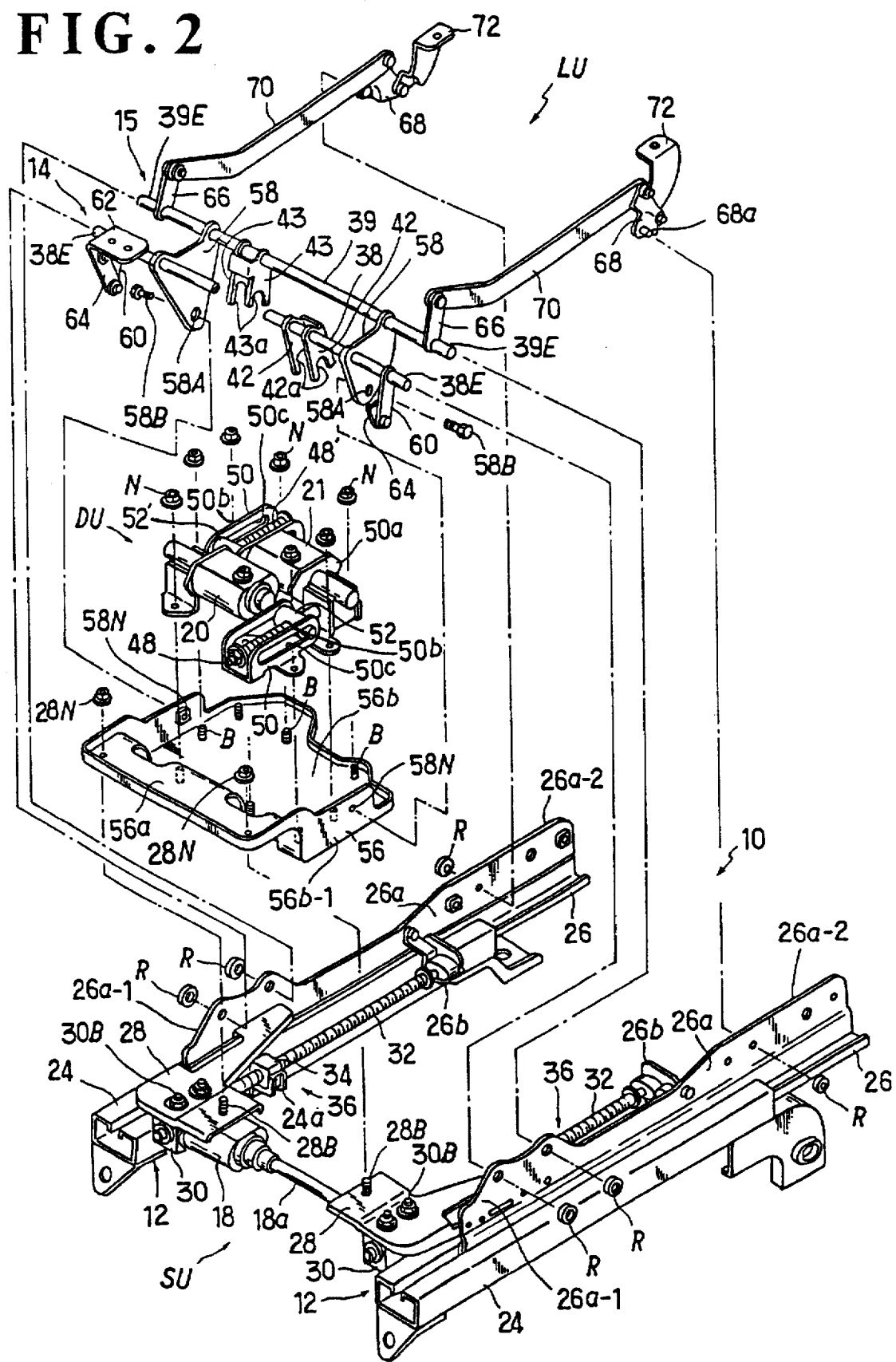
FIG. 2 is an exploded perspective view of the structure of powered seat in accordance with the present invention.

Referring to FIGS. 1 and 2, there is illustrated a structure of powered seat in accordance with the present invention, as generally designated by (10).

In this powered seat structure (10), there are basically provided a unit of height adjustment mechanism (LU), a unit of drive mechanism (DU) associated with such unit (LU), and a unit of fore-and-aft adjustment mechanism (SU).

The unit of fore-and-aft adjustment mechanism (SU) is shown as comprising a pair of slide rail devices (12)(12) and a pair of drive mechanisms (36)(36) for causing the respective upper rails (26)(26) to slidingly move along their respective mating lower rails (24)(24) in the forward and backward directions. Thus, this unit (SU) is worked for adjustment in position of a seat mounted thereon in the fore-and-aft direction. In accordance with the present invention, the unit (SU) is provided with a pair of spaced-apart main brackets (28)(28), each serving to support a forward end portion of each drive mechanism (36) and its associated connecting rod (18a) at a point inwardly of the two slide rail devices (12)(12), such as not to interfere with the lead screw spindle (32), and locate them within the height width of each lower rail (24), as best seen in FIG. 2. In addition thereto, the two main brackets (28)(28) serve as a mount on which the drive unit (DU) is secured, as will be understood later.

In brief, both slide rail devices (12)(12) and associated drive mechanisms (36)(36) themselves are structurally known in the art, but according to the illustrated embodiments in the present invention, each slide rail device (12) includes a forward common support area (26a-1) formed on the upwardly projected mount portion (26a) of upper rail (26). The two forward common support areas (26a-1)(26a-

1) respectively of the two upper rails (26)(26) serve to provide a common support point at which both connecting rods (38)(39) associated with the height adjustment unit (LU) are commonly and collectively supported at a forward end portion of the fore-and-aft adjustment unit (SU). Each lead screw spindle (32) of the drive mechanism (36) is fixed by bolts (30B), at the forward end portion thereof, to the main bracket (28) via a gear box (30), and fixed at the backward end portion thereof to the mount portion (26a) of upper rail (26) of the slide rail device (12) via a bracket (26b). In this respect, the drive mechanism (36) includes a nut block member (34) engaged threadedly with the lead screw spindle (32), the nut block member (34) being fixed via bracket (24a) to the inward surface of the lower rail (24). The motor (18) of the drive mechanism (36) is fixed to the reverse wall of the left-side main bracket (28), depending therefrom, at the left-side slide rail (12), as viewed from FIG. 2. A connecting rod (18a) is extended between the motor (18) and another gear box (30) of another drive mechanism (36) provided on the right-side slide rail (12).

The unit of height adjustment mechanism (LU) is worked for adjustment in height of a seat mounted thereon, and shown to comprise a forward seat lifter (14) and a backward seat lifter (15). Both forward and backward seat lifters (14)(15) themselves are of a known construction, each being operable to adjust, in height, the respective forward and backward portions of seat, but in accordance with the present invention, the two seat lifters (14)(15) are both supported collectively, at a forward point of seat, by a pair of downwardly extending common connecting brackets (58)(58), as one unit, and further connectable via first and second downwardly extending engagement pieces (42)(43) to the unit of drive mechanism (DU).

In brief, the forward seat lifter (14) is composed by a pair of spaced-apart linkages (60, 64)(60, 64) and a pair of securing members (62)(62) each being connected to the respective two linkages (60, 64)(60, 64). A seat cushion of an automobile seat or the like (not shown) is to be secured on both two securing members (62)(62). The two linkages (60, 64)(60, 64) are fixed to a first connecting rod (38) and operatively connected via a first engagement piece (42) to the associated drive mechanism including a motor (21) and a lead screw spindle (48). On the other hand, the backward seat lifter (15) is composed by a pair of linkages (66, 70, 68)(66, 70, 68) and a pair of securing members (72)(72) each being connected to the respective two linkages (66, 70, 68)(66, 70, 68). On both securing members (72)(72), a seat cushion (not shown) is to be secured. The two linkages (66, 70, 68)(66, 70, 68) are fixed to a second connecting rod (39) and operatively connected via a second engagement piece (43) to the associated drive mechanism including a motor (20) and a lead screw spindle (48').

In this respect, according to the present invention, it is particularly arranged such that the first and second connecting rods (38)(39) are collectively supported by the two common brackets (58)(58), that both ends (38E)(38E) of first connecting rod (38) as well as both ends (39E)(39E) of second connecting rod (39) may be secured collectively in the respective pair of common support areas (26a-1)(26a-1) of slide rail devices (12)(12) via securing rings (R), and that the two engagement pieces (42)(43) are fixed on those first and second connecting rods (38)(39), respectively, in an offset and spaced-apart relation with each other, such as to permit their respective cut-away arcuate engagement portions (42a)(43a) to be easily engaged over the respective cylindrical nut block members (52)(52') each being threadedly engaged with the respective mating lead screw spindles (48)(48'). With this arrangement, a whole body of the forward and backward seat lifters (14)(15) may be easily removed and connected, as one unit, from and to the slide rail devices (12)(12), via a sub bracket (56), as will be understood later.

In this connection, the backward end portions respectively of two backward seat lifter linkages (66, 70, 68)(66, 70, 68) are each provided with a connecting pin (68a) which is detachably secured via a securing ring (R) to the backward support area (26a-2) of slide rail device (12).

Furthermore, in accordance with the present invention, there are provided a sub bracket (56) and a drive mechanism support bracket (50). As best shown in FIG. 2, the sub bracket (56) is formed to have a securing area (56a) and a support area (56b), such that the support area (56b) is defined lower than the securing area (56a). The drive mechanism support bracket (50) is of such compact symmetrical configuration that it has, defined therein, a central motor support section (50a) in which two motors (20)(21) are adjoined together and secured collectively, and a pair of lead screw support sections (50b)(50b) which extend outwardly in a generally symmetrical fashion relative to the central motor support section (50a). As shown, the lead screw spindle (48) with a cylindrical nut block member (52) engaged therewith is rotatably supported in each of those two screw spindle support sections (50b)(50b). Designation (50c) denotes an elongated hole formed in each of the screw spindle support sections (50b), along which the nut block member (52) is moved slidingly. Each motor (20 or 21) is connected via a gear box (46) (FIG. 1) to one end of the lead screw spindle (48). Accordingly, with this arrangement, the drive mechanisms associated with the forward and backward set lifters (14)(15), i.e. the two motors (20)(21) and two lead screw devices (48, 52)(48', 52'), may be combined together as an extremely compact unit and secured on the support area (56a) of sub bracket (56) via bolts (B) and nuts (N), to thereby provide one unit of drive mechanism (DU). As shown, this unit of drive mechanism (DU) may be readily secured to the two main brackets (28)(28) by way of connecting the securing area (56a) of sub bracket (56) to those main brackets (28)(28) via bolts (28B) and nuts (28N). It is noted here that before such connection of drive mechanism unit (DU) to the main brackets (28), the two connecting brackets (58)(58) should be secured to the respective two lateral walls of sub bracket (56) via bolts (58B) and nuts (58N), in a detachable way, with the two engagement pieces (42)(43) being in engagement over the two respective nut block members (52)(52').

FIG. 1 shows a resultant construction of powered seat assembled by the above-described units of seat adjustment mechanisms. In this case, it is suited for use in a driver's seat.

It is now to be appreciated that the present invention is endowed with the following advantages: (i) Both units of height adjustment mechanism and drive mechanism (LU)(DU) are secured to the sub bracket (56) to provide one unit of height adjustment mechanism. Thus, such one unit of height adjustment mechanism is detachably secured via the sub bracket (56) to the main brackets (28)(28) and may be easily removed from the unit of fore-and-aft adjustment mechanism (SU), to thereby permit direct use in an assistant or navigator's seat which does not require height adjustment, and in that case, a wide space is obtained between the two slide devices (12)(12), permitting other uses for the assistant seat. (ii) The motor (18) for the slide rail devices (12)(12) may be easily secured to the main bracket (28) which projects inwardly of the slide rail device (12), i.e. a common support point to which is also fixed the sub bracket (56) of drive mechanism unit (DU), hence requiring no other support bracket and avoiding interference with the lead screw spindle (32) and nut block member (34). Further, with this arrangement, the motor (18) is not directly connected to the slide rail device (12) and thus not damaged from an external load imparted through the upper rail (26) of slide rail device (12). (iii) The strength for supporting the motors (18)(20)(21) can be enhanced only by increasing the thickness of main bracket (28) or by adjusting the thickness of both main and sub brackets (28)(56), without need to increase the thickness of support members of slide rail devices (12)(12) and other surrounding support elements, which is effective in reducing the entire weight of powered seat.

While having described the present invention above, it should be understood that the invention is not limited to the illustrated embodiment, but other modifications, replacements and additions may be structurally applied thereto without departing from the appended claims. For example, the two main brackets (28)(28) may be formed together into a single main bracket, and the two common connecting brackets (58)(58) may be provided in a singular form as one common bracket to be fixed to the sub bracket (56).

What is claimed is:

1. A powered seat having a pair of seat fore-and-aft adjustment devices having a motor, each of said pair of seat fore-and-aft adjustment devices including an upper movable member to be moved by said motor to adjust a position of the seat in forward and backward directions, and a pair of forward and backward seat height adjustment devices, each including a linkage having one end to be connected to said pair of seat fore-and-aft adjustment devices and a drive mechanism for causing respective forward and backward portions of the seat to be adjusted in height via said linkage, said powered seat further comprising:

a main bracket to which said motor of said pair of seat fore-and-aft adjustment devices is secured, said main pair of seat fore-and-aft adjustment devices is secured, said main bracket being disposed on one end portion of said upper movable member corresponding to a forward side of the seat; and a sub bracket detachably secured to said main bracket;

said pair of forward and backward seat height adjustment devices being secured to said sub bracket to thereby provide one unit with said seat height adjustment devices is detachably mounted on said main bracket via said sub bracket.

2. The powered seat as defined in claim 1, which further includes: at least one support means for collectively supporting both said another ends of said linkages respectively of said pair of forward and backward seat height adjustment devices and further connecting the same another ends of said linkages to said sub bracket; and an engagement means for operatively engaging said another ends of said linkages with said drive mechanisms respectively of said pair of forward and backward seat height adjustment devices.

3. The powered seat as defined in claim 2, wherein said at least one support means is provided in a manner dependent from said another ends of said linkages towards said sub bracket.

4. The powered seat as defined in claim 1, wherein a pair of said main brackets are provided on said pair of seat fore-and-aft adjustment devices, respectively, in a spaced-apart relation from each other.

5. A powered seat having a pair of seat fore-and-aft adjustment devices having a motor, each of said pair of seat fore-and-aft adjustment devices including an upper movable member to be moved by said motor to adjust a position of the seat in forward and backward directions, and a pair of forward and backward seat height adjustment devices, each including a linkage having one end to be connected to said pair of seat for-and-aft adjustment devices and a drive mechanism for causing respective forward and backward portions of the seat to be adjusted in height via said linkage, wherein said drive mechanism includes a motor and an actuator element to be driven by said motor to move said linkage for height adjustment of the seat, said powered seat further comprising:

a main bracket to which said motor of said pair of seat fore-and-aft adjustment devices is secured, said main bracket being disposed on one end portion of said upper movable member corresponding to a forward side of the seat;

a support means for supporting both said another ends of said linkages respectively of said pair of forward and backward seat height adjustment devices, in a collective manner;

an engagement means disposed adjacent to said support means, said engagement means being for operatively connecting together another ends of said linkages and said actuator elements respectively of said pair of forward and backward seat height adjustment devices; and a sub bracket detachably secured to said main bracket;

said another ends of said linkages, said motors and said actuator elements associated with said pair of forward and backward seat height adjustment devices being detachably secured to said sub bracket via said support and engagement means, to thereby provide one unit of said seat height adjustment devices, wherein said one unit of seat height adjustment devices is detachably mounted on said main bracket.

6. The powered seat as defined in claim 5, wherein said support means comprises at least one connecting bracket for collectively supporting both said another ends of said linkages respectively of said pair of forward and backward-seat height adjustment devices and further connecting the same another ends of said linkages to said sub bracket, and wherein said engagement means comprises a pair of engagement pieces, each being so formed to have one end fixed to each of said another ends of said linkages and another end to be engaged with each of said actuator elements.

7. The powered seat as defined in claim 6, wherein said at least one connecting bracket is provided in a manner dependent from said another ends of said linkages towards said sub bracket.

8. The powered seat as defined in claim 5, wherein a pair of said main brackets are provided on said pair of seat fore-and-aft adjustment devices, respectively, in a spaced-apart relation from each other.

9. The powered seat as defined in claim 5, which further includes a bracket for collectively arranging therein said motors and actuator elements associated with said pair of forward and backward seat height adjustment mechanisms in such a manner as to permit said engagement means to be readily engaged with said actuator elements, and wherein said bracket is detachably secured to said sub bracket.

* * * * *